United States Patent
Gattegno et al.

(10) Patent No.: US 8,060,738 B2
(45) Date of Patent: Nov. 15, 2011

(54) PROCEDURE FOR BOOTING A FIRST COMPUTER USING THE OPERATING SYSTEM OF A SECOND COMPUTER

(75) Inventors: Yves Gattegno, L'Hay les Roses (FR); Philippe Auphelle, Chatiilon (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 12/086,164

(22) PCT Filed: Dec. 12, 2006

(86) PCT No.: PCT/IB2006/003573
§ 371 (c)(1),
(2), (4) Date: Jun. 6, 2008

(87) PCT Pub. No.: WO2007/069035
PCT Pub. Date: Jun. 21, 2007

(65) Prior Publication Data
US 2009/0287915 A1    Nov. 19, 2009

(30) Foreign Application Priority Data
Dec. 13, 2005   (EP) ..................................... 05292657

(51) Int. Cl.
G06F 9/24      (2006.01)
G06F 15/177    (2006.01)
G06F 1/24      (2006.01)
G06F 11/16     (2006.01)
G06F 11/00     (2006.01)

(52) U.S. Cl. ............... 713/100; 713/1; 713/2; 714/4.11; 714/100

(58) Field of Classification Search .................. 713/1, 2, 713/100; 714/4.11, 100
See application file for complete search history.

(56) References Cited

U.S. PATENT DOCUMENTS

| | | | |
|---|---|---|---|
| 5,615,330 A * | 3/1997 | Taylor | 714/6.32 |
| 5,887,164 A * | 3/1999 | Gupta | 713/2 |
| 6,301,612 B1 * | 10/2001 | Selitrennikoff et al. | 709/220 |
| 6,536,040 B1 | 3/2003 | Curtis | |
| 6,718,463 B1 | 4/2004 | Malik | |
| 7,334,157 B1 * | 2/2008 | Graf et al. | 714/13 |
| 2002/0078188 A1 * | 6/2002 | Anand et al. | 709/222 |
| 2003/0033441 A1 | 2/2003 | Forin et al. | |
| 2003/0208675 A1 | 11/2003 | Burokas et al. | |
| 2004/0117610 A1 | 6/2004 | Hensley | |
| 2005/0038933 A1 | 2/2005 | Himmel et al. | |

FOREIGN PATENT DOCUMENTS
WO    WO0065438    2/2000

* cited by examiner

Primary Examiner — Ji H Bae (57) ABSTRACT

A method for operating at least one first computer entity with an operating system of a second computer entity includes: detecting and registering a set of initialization data and driver files stored in the first entity computer entity, copying the driver files into the files of the second operating system, adapting each of the files, and reading and adapting the initialization data, for the second operating system, injecting the initialization data into initialization structures of the second operating system, making the media containing the second operating system available to the first computer, initializing the first computer entity with the second operating system, the initialization structures being used by the second operating system to initialize and operate the device controller of the at least one bootable device, and the device controller controlling access to the media that stores computer files of the second operating system to follow the initialization of the first computer entity with the second operating system.

11 Claims, 3 Drawing Sheets

PROCEDURE FOR BOOTING A FIRST COMPUTER USING THE OPERATING SYSTEM OF A SECOND COMPUTER

This Application claims the benefit of European Application No. 0592657 filed Dec. 13, 2005 and also claims the benefit of PCT International Application No. PCT/IB2006/003573 filed Dec. 12, 2006, both of which are hereby incorporated by reference.

FIELD OF THE DISCLOSURE

The present invention relates to computer systems and their peripherals.

BACKGROUND

Figure 1:
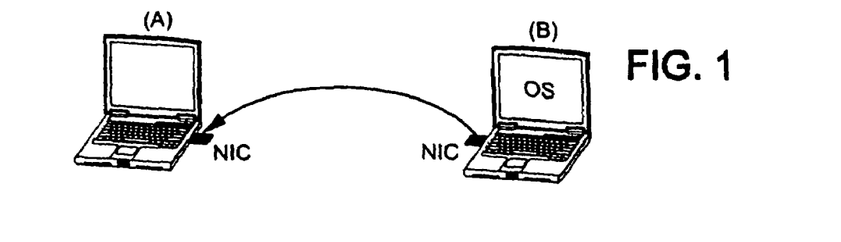
FIG. 1 is an illustration of the two computers communication.

With reference to FIG. 1, the object of the present invention is more particularly to be able to boot at least one first computer (A) using the operating system (OS) of a second computer (B), for example in order to network a plurality of 'slave' terminals or even in case of partial failure of the operating system of the first computer (A), in case of partial failure of one of its peripherals such as its hard disk and for retrieving data from it, or in order to be able to use a single "logical" operating system instance (or operating system image) to operate the different computers using completely heterogeneous hardware.

To be able to boot the first computer (A) with the operating system of the second computer (B), the first computer (A) must be equipped with peripherals (Network Interface Controller (NIC), Hard Disk Drive (HDD), etc) which allows it access to the operating system of the second computer (B), either through a copy of the media containing the operating system files, or a direct connection or an indirect connection.

To perform this operation, it is commonly thought that it would suffice to recover the drivers from the first computer (A) and store them into the second computer (B).

But this is not enough with modern Operating Systems that use internal structures initialised when the devices are detected and then further used to operate said devices without re-detecting them. In order to detect the devices, the operating system component in charge with devices detection and configuration (e.g. Plug'N'Play manager) must be up and running. This component is usually up and running very late in the boot process of the operating system because it relies on a lot of resources provided by said operating system. The component in charge with device detection and initialisation then cannot detect and initialise the boot device controller used to boot the operating system (this problem is commonly known as "chicken and egg problem" in the Information Technology world). Boot device controllers are usually detected and initialised when the operating system is (first) installed. Modern operating systems are usually designed to be installed on a specific computer hardware. Then, moving an operating system already installed to some other kind of hardware is usually not possible because the boot device controllers are not the same and the operating system installed for being used with a specific type of boot device controller cannot be used with another type of boot device controller.

Older operating systems such as MS-DOS® were able to be transferred from one hardware platform to another, because the hardware platforms were fully compatible with personal computer (PC) hardware, whose specifications were publicly available. They were able to use the same sets of instructions to be operated. Some sets of instructions, inherited from these old days, are still usable in modern personal computers (for instance VGA or VESA for graphic adapters, or ATA/IDE for disk drive controllers). The computers are also using standards (actual or de facto) such as PCI bus.

The modern computers, especially the ones still called "PC compatibles", are still using some of these compatible instructions sets to begin the boot process of the operating system (even a modern one). In particular, they rely on standard BIOS or firmware mechanisms to operate the video, disk drives and keyboard during the very first step of the boot process.

But the modern operating systems need to be able to free themselves from the firmware/BIOS mechanisms used to operate the various devices and components of the computer, in order to be less limited, to be faster, to be truly multitask, to be more efficient etc. Then, the modern operating systems need to operate (control) directly the devices and controllers using device drivers especially developed for a particular operating system to operate a particular device or controller. For instance a modern PC computer will boot using at first a BIOS based video instructions (character mode and then VESA compatible mode) that all the computers of the PC compatible type can use and then, as soon as possible, the operating system will load and initialise a very specific driver for a very specific video controller actually in the computer. This video adapter, though it can be operated through a set of compatible instructions (PC-type or TTY-type character instructions, VESA instructions, etc.), has the best results and performances when using the driver specific for it. For instance, VESA mode cannot be used to display images in 1024*768 with 24 millions of colours per pixel.

A modern computer is often booted off a hard disk drive. A modern PC computer will boot using at first BIOS based disk drive instructions (interruption int13h) that all the computers of the IBM-PC compatible type can use and then, as soon as possible, the operating system will load and initialise the very driver for the very disk drive controller actually in the computer. This makes disk access faster, and makes it possible to use the complete space of the disk drive when the BIOS or firmware may be able to assign only the beginning of it. Using BIOS based instructions, some PC-compatible computers can access only the first 4 GigaBytes of any hard disk drive, when modern computers are commonly using disk drives larger than 40 GB.

However, the operating system can use only one kind of disk drive controller. If some hard disk drive is moved to a computer that uses another kind of hard disk drive controller, even if both controllers can be operated through compatible instruction sets, the operating system on the disk drive will be loaded as long as the compatible set of instructions are used. When the operating system needs to use the set of instructions specific to a disk drive controller, the operation will fail however if the disk drive controller is not one that the operating system can operate, because the controller does not "understand" the set of instructions that the operating system is able to use to read and write data on the boot disk drive.

Furthermore, modern computers are using chained device controllers and devices and the operating system must be aware of the chain to be able to operate a specific device. For instance, the disk drive controllers in modern computers of the classes IBM-PC™ compatible or Apple Macintosh™ are usually using the PCI Bus interface. The chain then comprises at least PCI Bus controller-PCI interface-Disk Drive controller-Disk drive. The operating system must not only know how to operate each controller, device or interface, but also how this chain is constructed and how each device interacts with the adjacent ones. For instance, the operating system must know in which PCI slot a specific controller is connected. The data related to the chain itself are stored in some internal structures used by the operating system. In MS-Windows™ systems, some of these structures are stored in the system registry. These structures are created and initialised when the device or controller is detected and installed. The structures related to boot devices are initialised when the operating system is installed. The installation procedure of modern operating system usually comprises the loading of a minimal set of components that can use the compatible sets of instructions to operate the computer and that can then load and execute the component in charge of detecting the boot devices and initialising the related structures. When this is done, the computer is rebooted, and the actual operating system is loaded and executed. It is then able of using the suitable specific set of instructions to operate the device controller for the boot device (i.e. to read and load files that contain the rest of the operating system components). Then, the component of the operating system in charge with devices detection and initialisation can be loaded and executed and the rest of the devices that are not required for booting (for instance sound cards, USB controllers etc.) can then be detected and initialised.

One recent evolution of modern operating systems is that they may be able to be completely booted over the network, without requiring the use of a disk drive or a disk drive controller in the computer they operate. Some sets of instructions like the PXE instructions set (defined in PXE specifications), can be used to handle the first part of the boot process (the one that usually relies on BIOS or firmware). From then on, the boot device controller used by the operating system is the Network Interface Controller (NIC). Interestingly, there is no set of compatible instructions for NICs like there are for Video Controllers (VESA for instance) or for IDE Disk Drive controllers (the IDE disk drives can be operated through the eight first instructions of Western Digital's WD1003 Disk Drive controller). PXE is a layer above the network card itself, but PXE instructions set could not be used efficiently to operate a modern NIC in a modern operating system. PXE has been designed only to provide "early steps" boot capabilities to NICs. PXE works at the BIOS level.

Recently, some techniques have been used to allow moving an operating system made for a specific hardware platform to another hardware platform. Several techniques have been implemented to use the compatible set of instructions existing in some devices or device controllers.

Microsoft® Sysprep tool for instance can "prepare" an existing Windows® operating system to be moved to some "unknown hardware platforms" (unknown meaning "currently unknown to the operating system to be moved"). Yet, this tool requires the user to manually provide the drivers and related files for the disk drive controller to be used in the various unknown hardware platforms. Windows® can then be booted on each kind of platform, with a set of minimal capabilities very similar to what the installation procedure would have created if said installation procedure had been run on said hardware platform. Furthermore, the result of deploying an original operating system to various hardware platforms using Sysprep creates as many different logical instances of the operating system as there are hardware platforms. In other words one cannot directly move an operating system previously moved using Sysprep from one platform to another one currently unknown. Furthermore, Sysprep can handle only Windows® operating systems when they are booted using Disk Drive Controllers. It cannot be used with Network Booted Windows® systems.

Another technique makes it possible to build a logical instance of an operating system (a set of files that comprises an operating system and its configuration) that can operate heterogeneous hardware platforms. This technique makes it possible for Windows to boot "unknown hardware platforms" using ATA/IDE compatible mode. Obviously, this technique is restricted to systems that are booted off IDE disk drives. This technique requires that an IDE disk drive is successively moved (or cloned) from one hardware platform to another, and after being moved (or cloned) the IDE disk drive must be used to boot the hardware platform. The operating system can then boot and detect the hardware in the platform it runs on, including the specific disk drive controller in said platform. The operating system must then be configured again to be able to use compatible IDE mode before it is moved to another hardware platform. This technique is used, for instance, in UbiBoot technology of the applicant and also described in Microsoft Knowledge base article #314082

Some operating systems like Linux use "probing". They embed a plurality of drivers for boot devices (and other devices) and at boot time, the operating system probes the hardware and if a device that is supported is detected (i.e. the device and the driver for this device are present respectively in the computer and in the operating system), then the device can be used. In that sense, this is similar to Sysprep when it is wished to move a system disk from one platform to another. If the disk drive controller that is detected in the "unknown platform" is not in the list of the disk drive controllers that the operating system can operate, the system will not finish its boot process. Linux operating systems often embed drivers that can use compatible set of instructions for boot device controllers using a standard (such as ATA/IDE) to be operated.

SCSI device controllers do not have a standardized compatible instructions set. The SCSI device controllers use standard SCSI instructions set to operate SCSI devices, but the controllers themselves can only be used through "proprietary" instructions sets (Proprietary instructions-SCSI Controller-SCSI Standard Instructions-SCSI devices). Thus, the techniques described above cannot be used to move an operating system using only one specific type of SCSI controller as its boot device controller to another hardware platform using another type of SCSI controller.

Similarly, none of the techniques mentioned above can be used to move an operating system booted off a network server from one hardware platform using one type of network interface controller to another platform using another type of network interface controller.

SUMMARY

A particular object of the present invention is to improve the existing situation. To this end, the invention aims first of all at a method for operating at least one first computer entity with an operating system of a second computer entity.

The first and second computer entities are Plug-And-Play compatible and are operated with respective first and second Plug-And-Play compatible operating systems.

The first computer entity comprises at least one bootable device, and at least one Plug-And-Play compatible device controller for operating said bootable device.

The first computer entity further stores at least one set of initialisation data and driver files used by said first operating system to initialise and operate said device controller.

Computer files of said second operating system are stored in a media further storing initialisation structures intended to be used by the second operating system to initialise and operate at least the second computer entity.

According to the invention the first computer entity is operated with the second operating system through the bootable device controller of the first computer entity, said bootable device is arranged for giving access to said media, and the method comprises the steps of:

a) detecting and registering said set of initialisation data and driver files stored in the first computer entity,
b) copying said driver files into the files of the second operating system,
c) adapting each of said files, and reading and adapting said initialisation data, for the second operating system,
d) injecting said initialisation data into initialisation structures of the second operating system,
e) making said media containing said second operating system available to said first computer,
f) initialising the first computer entity with the second operating system, Therefore, the initialisation structures can be used by the second operating system to initialise and operate the device controller of the bootable device and the device controller controls access to the aforesaid media that stores computer files of said second operating system to follow the initialisation of the first computer entity with the second operating system.

The invention also aims at a computer entity program comprising instructions for the implementation of the method as set forth above.

The invention also encompasses a data storage media (such as a CD-ROM, disk or similar) comprising program code instructions of the computer entity program as set forth above.

BRIEF DESCRIPTION OF THE DRAWINGS

Other characteristics and advantages of the present invention appear from the following detailed description of the present invention, given as non-limitative examples and with reference to the accompanying drawings, in which.

DETAILED DESCRIPTION

In the various figures the same references designate elements that are identical or similar.

In the following, booting a computer is taken to mean starting and initialising a computer entity in order to make it useable by a user.

Figure 2A:
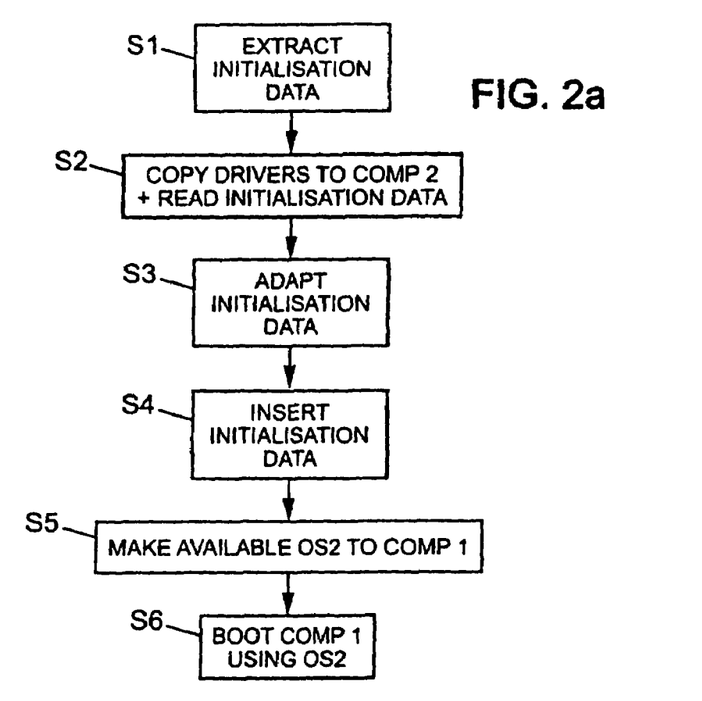
FIG. 2a is a flowchart illustrating the steps to boot a first computer with the operating system of a second computer.
Figure 2B:
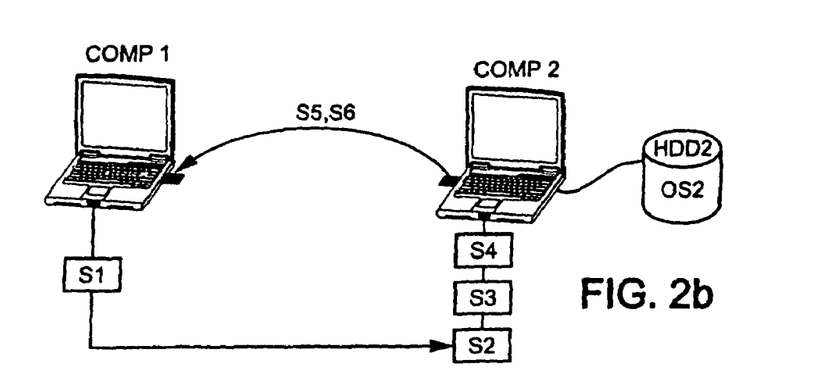
FIG. 2b is the physical setup and illustrates steps taken of the same embodiment as in FIG. 2A.

FIGS. 2a and 2b illustrate the steps taken to effect a boot of a first computer entity COMP1 using the operating system OS of a second computer entity COMP2. The first computer may have suffered complete or partial hardware failure making it incapable of booting off its own resources.

Both computer entities must be Plug-And-Play compatible, and must be operated using Plug-And-Play operating systems.

The first computer entity COMP1 still comprises at least one working bootable device and at least one working device controller for operating the bootable device, which may be a hard disk drive or a network interface card. In fact, the bootable device may be any peripheral permitting access to the operating system useable by another computer.

The second computer entity COMP2 comprises a working operating system OS2 (FIG. 2b). The second operating system OS2 of the second computer entity COMP2 is stored on a media, such as a hard disk drive (stored locally or remotely), and further contains intialisation structures intended to be used by the second operating system OS2 to initialise and operate the second computer entity COMP2. For example, the initialisation structures comprise Windows® Registry entries (keys and values) under the hives:
HKEY_LOCAL_MACHINE\SYSTEM\CurrentControlSet\Enum\<BusType>,
HKEY_LOCAL_MACHINE\SYSTEM\CurrentControlSet\Control\Class\<DeviceController Class GUID>,
and various initialisation files with an .inf extension stored in INF subfolder under Windows® folder.

The first computer entity COMP1 is operated with the second operating system OS2 through its own bootable device arranged for giving access to the storage media. The second computer entity's operating system OS2 will, therefore, become "enhanced" with the added support of the hardware of the first computer entity's boot device controller.

FIG. 2a illustrates a flowchart detailing the steps needed to achieve the aims of the invention. In this, and subsequent, figures:

step S1 comprises the operation of detecting and retrieving ("sniffing" or "extracting") a set of initialisation data corresponding to the first computer entity's COMP1 hardware, including device drivers relating to the device controller, and storing said initialisation data on a storage media;

step S2 comprises the operation of copying driver files into the second operation system OS2 repository for drivers and of reading data extracted in step S1 from the first computer entity's operating system OS1;

step S3 comprises the operation of adapting the initialisation data from step S1 for a destination system, here the operating system OS2 of a second computer entity COMP2;

step S4 comprises the operation of inserting and installing ("injecting") in a destination system, here the operating system OS2 of second computer entity COMP2, the adapted initialisation data from step S3 into the destination computer's COMP2 initialisation structure;

step S5 consists of making the first computer entity COMP1 able to boot off the media that contains the second operating system OS2 (for instance by the mean of a disk drive transfer from the second COMP2 to the first COMP1 computer entity or by setting a virtual drive system in such a way that the virtual drive previously used to boot the second computer entity COMP2 is now used to boot the first computer entity COMP1) thereby giving the first computer entity COMP1 access to said media;

step S6 comprises the step of booting the first computer entity COMP1, using the newly modified initialisation structures in the second operating system OS2 stored on the media mentioned in step S5 to access and operate the device controller in the first computer entity COMP1.

The storage media as described above for storing the initialisation data from the first computer COMP1 is, for example, a hard disk drive, a CD-ROM, a USB key or a remote network storage repository, but is in no way limited to these examples.

FIG. 2b exemplifies a simple embodiment, illustrating the steps described in FIG. 2a. The first computer COMP1 as well as the second computer COMP2 are as described above and are connected to each other via network interface controllers. The first step S1 (FIG. 2a) involves "extracting" the aforesaid initialisation data from the first computer COMP1 and storing the data onto a storage medium, for example a removable USB key or a diskette. The USB key or the diskette would then be brought to the second computer COMP2 for continuation of the procedure.

The second step S2 involves copying the drivers to the destination computer COMP2 and reading the data extracted in step S1. The third step S3 involves adapting the initialisation data to be compatible and/or coherent with the destination computer COMP2 (or, more specifically, using the second computer's operating system OS2). This is important when trying to boot the second operating system OS2 using the hardware of COMP1, when the system architectures and the operating systems are dissimilar. However it is always needed, even when the first and second computer COMP1, COMP2 are booted with identical operating systems.

The steps S3 and S4 (FIG. 2a) of adapting and inserting the data are normally performed together at the same time as the insertion step S4, and usually in the same sequence. The adaptation could however also be performed posterior to the extracting operation and before storage on the media containing the second operating system OS2, thereby leaving a simple injection of the initialisation data into the initialisation structure of the second computer COMP2.

The media containing operating system OS2 would next be made available to the device controller of the first computer COMP1 (step S5), which would allow it to control the boot device present in the first computer COMP1 and then boot from this devices (step S6) using its the operating system OS2.

Although in this example the media HDD2 containing the operating system OS2 is local to the computer entity COMP 2, it is of course realisable for the media HDD2 to be a remotely stored virtual drive. The insertion step S4 would still happen through the second computer entity COMP2, and HDD2 would still be made available to the first computer COMP1 to boot off it.

Advantageously, at least a portion of the adaptation performed in step S3 is executed in function of a configuration of the second operating system OS2 (preferably in function of the initialisation data present in the second operation system OS2).

In an embodiment, the adapting step performed in step S3 (step c) according to the wording of the appended claims) comprises adapting UUID data as registered in step S1 to match UUID data present in the second operating system OS2.

This embodiment is detailed hereafter.

In this embodiment which may, for example, be realised to adapt data from a first computer entity COMP 1 for a second computer entity COMP2, such as those effected as part of step S3, one may use the modification of UUID data (Universal Unique IDentifier) stored in a system registry used by the first and second operating systems OS1, OS2 as the main repository for setup, configuration and initialisation data or parameters.

In such an embodiment, such a modification, as part of step S3, would adapt the UUID, which make up a part of the collected initialisation data of step S1. This UUID, at its target destination, can be recorded in various areas of the second operating system OS2 system registry, whether as a standalone registry key, value name or value data, whether as a part of keys, value names or value data. This adaptation can be, for instance, to use a different UUID than the one previously extracted to render it coherent with the second computer entity's operating system OS2, for instance by reusing the UUID of the bootable device controller present in the second computer entity's operating system OS2 at the time when the adaptations are performed (step S3).

What follows is an example of an adaptation illustrating this, according to step S3. It is performed on two computer entities COMP1, COMP2, each operating the Windows® operating system and each using network cards as their bootable device controllers.

Before any operations are performed, the first computer entity COMP1 may for example have the following details present in its system registry (OS1):

[Path to network cards class]\0003
"DriverDesc"= "Broadcom NetXtreme Gigabit Ethernet"
"MatchingDeviceId" = "pci\ven_14e4&dev_167d&subsys_05771014"
"NetCfgInstanceId" = "{B95085E4-20E6-47C6-9403-3A442AC16C45}"
...
[Path to TCPIP network protocol configuration]\Linkage
"Bind"       = ...
    "\Device\{B95085E4-20E6-47C6-9403-3A442AC16C45}"
...
[Path to TCPIP network protocol configuration]Parameters\
Parameters\Interfaces\{B95085E4-20E6-47C6-9403-3A442AC16C45}

The second computer entity COMP 2 may have the following details present in its system registry (OS2):

[Path to network cards class]\00012
"DriverDesc"= "Via Rhine II network controller"
"MatchingDeviceId" = pci\ven_1106_dev3065
"NetCfgInstanceId" =
"{07FF0F6A-3D90-4DCC-A39D-C54EC29FB3BC}"
...
[Path to TCPIP network protocol configuration]\Linkage
"Bind"       = ...
    \Device\{07FF0F6A-3D90-4DCC-A39D-C54EC29FB3BC}
...
[Path to TCPIP network protocol configuration]Parameters\
Parameters\Interfaces\{07FF0F6A-3D90-4DCC-A39D-C54EC29FB3BC}

After the injection step S2, and the adaptation step S3, the following details may then be found in the system registry of the second computer entity's operating system.

[Path to network cards class]\00012
"DriverDesc"= "Via Rhine II network controller"
"MatchingDeviceId" = "pci\ven_1106_dev3065"
"NetCfgInstanceId" =
"{07FF0F6A-3D90-4DCC-A39D-C54EC29FB3BC}"
...
[Path to network cards class]\0014
"DriverDesc"= "Broadcom NetXtreme Gigabit Ethernet"
"MatchingDeviceId" = "pci\ven_14e4&dev_167d&subsys_05771014"
"NetCfgInstanceId" =
"{07FF0F6A-3D90-4DCC-A39D-C54EC29FB3BC}"
...

-continued

```
[Path to TCPIP network protocol configuration]\Linkage
"Bind"         = ...
    "\Device\{07FF0F6A-3D90-4DCC-A39D-C54EC29FB3BC}"
    ...
[Path to TCPIP network protocol configuration]Parameters\
Parameters\Interfaces\{07FF0F6A-3D90-4DCC-A39D-C54EC29FB3BC}
```

In which:
[Path to network cards class]
   is the index of the network card of which we will extract details (during step S1)
"DriverDesc"
   is the friendly name corresponding to the network card driver concerned
"MatchingDeviceId
   is the hardware identifier, unique to the type of network card type and model in question
"NetCfgInstanceId"
   is the a UUID associated to this instance of the very network card in question
[Path to TCPIP network protocol configuration]\Linkage
   is where the network cards that can use the TCP/IP network protocol are listed, and referred to by their UUID corresponding to "NetCfgInstanceId"
[Path to TCPIP network protocol configuration]
   is where the TCP/IP component stores the configuration parameters for each network controller it can use, again referred to by their UUID corresponding to "NetCfgInstanceId"

The step S3 of adapting the initialization data (of which the above registry details is a part of), consists of making sure that it becomes coherent for use in the target system, here the second computer entity COMP2.

The first computer COMP1 entity's registry data are therefore copied over to the second computer entities COMP2, but adapted in the following way:
   the [Path to network cards class]\<IndexOfNetworkCardDriverRepresentation> is adapted to be in coherence with what existed previously in the second computer entity's operating system, i.e. for there to be no two paths the same in the same computer entity (in our example, this index was extracted as 0003 and inserted as 0014. This may result from the fact that the index 0003 and 0013 already existed in OS2's registry configuration),
   the "NetCfgInstanceId" copied from the first computer entity COMP1 is adapted to reflect the second computer entity's 'NetCfgInstanceId'.

As a result of these adaptations, the "[Path to TCPIP network protocol configuration]\Linkage", and the "[Path to TCPIP network protocol configuration]" will have only one UUID, such that in fact two actual network card are "pointing" to this entry.

Note that the present example did not list all the places where the UUID's are used, as there are too numerous to list here. The advantage of the present invention is clear, as re-using an existing compatible UUID (that pre-existed in OS2) is much easier than trying to re-create a coherent setup after injection.

A portion of the adapting step performed in step S3 is thus executed in function of a configuration of the second operating system OS2, in order to render it coherent with the configuration present on the second computer operating system OS2.

This adaptation is especially useful when it makes it possible to re-use presently known and existing data (for instance UUIDs) on the second (target) computer entity COMP2, for similar devices or device controllers, as it makes the insertion process simpler and shorter. In this case, the existing data is used as a template during step S3 to facilitate adaptation and insertion.

If, however, a new UUID is used, the insertion process involved at step S4 can be longer and more complex as it involves the need to scan the complete set of the second operating system's OS2 configuration data to determine where and how the new UUID has to be inserted. Yet this is another way of adapting the previously extracted data, by computing a new UUID and using it for the inserted data. The adaptation step would then require to scan the complete system registry, detect the presence of the UUID pre-existing in the second operating system OS2 prior to step S4, and add the same entries that pre-existed and used the pre-existing UUID with the pre-existing UUID being replaced by the new UUID.

The new UUID may even be the one that was extracted. It would, however, not be a simple "copy and paste" of the extracted data into the second operating system OS2's system registry. For instance, the TCP/IP protocol may not have been installed in the first operating system OS1 at extraction time and then, the related entries could not be inserted. The adaptation step would then require to create the related entries for the "device to be inserted" to work exactly as a device of the same type (a Network Card controller in our example) pre-existing in the second operating system OS2 prior to insertion.

In a further exemplary embodiment of what may constitute adaptation (during step S3) of the extracted data (from step S1) from the first computer entity COMP1 into the second computer entity COMP2, one may have recourse to renaming files or data detected and copied from the first computer entity COMP1 in order for them not to overwrite destination data in the second computer entity COMP2. In this case, references to these renamed files or data, for example those contained in registry data, must reflect and follow such renaming. Furthermore, one may also have recourse to modifying references to extracted files, modifying data extracted from the system registry of the first operating system OS1 in order to be coherent and/or compatible with the second operating system OS2 registry, or even modifying the configuration structures of the second operating system OS2 to create coherent references to the injected data (at step S4).

As the method described hereabove relies on the transfer and adaptation of initialisation data, it is not restricted to a single mode of operation, execution, or indeed environment. The method can be implemented indeed with destination systems of any type, provided that they are Plug-And-Play compatible. This group may comprise such operating systems as Windows® as indicated above, Linux, MAC OSX®, FreeBSD, or Unix®.

For example, in the case where the operating system in question is a Macintosh® OS X type system, the initialisation structures comprise various initialisation and configuration files usually used by the kernel and the device controller drivers, for instance configuration files under /usr/src/sys and /System/Library/Extensions, however they may be found in diverse locations. In the case where the operating system in question is a Linux type system, the initialisation structures comprise various initialisation and configuration files usually used by the kernel and the device controller drivers, for instance configuration files in /usr/kernel/drv/, however they may be found in diverse locations.

In all cases, any of such data adaptation corresponding to step S3 for the target system (the second computer entity COMP2), aims to reproduce the result or behavior which would have been obtained had the installation of the bootable device and the bootable device controller been duly and physically installed on the second computer entity. The dispositions of the present invention in no way modify low-level system properties.

Figure 3:
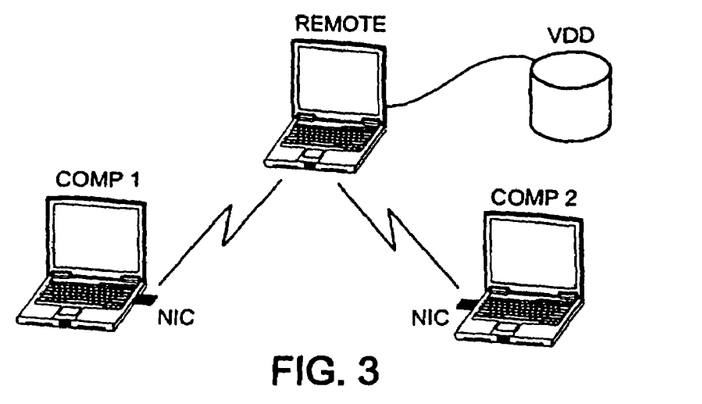
FIG. 3 illustrates two computers connected to each other via a networked server or disk drive.

The embodiment illustrated hereabove describes communication between two computers comprising a direct link to each other, such as through a network to boot off each other. The storage medium used to store and transfer the initialisation data from the first COMP1 to the second COMP2 computer entity is a removable medium, a USB key in the example described. FIG. 3 illustrates the same two computer entities COMP1, COMP2, still comprising a Network Interface Card (NIC). However, this embodiment has access to a third computer entity REMOTE, possibly a server machine, having a storage medium, and which is able to act as a link between the first COMP1 and the second COMP2 computer, through an Ethernet network for example. This is not limited to a third computer entity acting as a storage medium and link between the two computers, but merely illustrates the idea that the initialisation data from step S1 does not have to be physically transferred from machine to machine, but could use pre-existing infrastructure. If, for example, a set of initialisation data was previously gathered and stored on a third system, such as a server REMOTE, it would suffice to transfer this data directly via Ethernet, or any of its associated services such as e-mail, to the second computer entity COMP2 for adaptation (step S3) and injection (step S4), to in turn boot the first computer COMP1 using the new initialisation structure.

It is therefore clear that the initialisation data retrieved from the first computer COMP1 can be stored and registered on a machine REMOTE also accessible by the second computer COMP2 via the network interface card. It would also be clear that machine REMOTE, may be more simply a virtual disk VDD (FIG. 3) server, accessible by all computer entities.

As shown above, all that is required for a first computer entity to be able to boot off a second computer entity's operating system OS2 is a bootable device installed on the first computer entity COMP1 and a set of initialisation data pertaining to the hardware installed in the first computer entity. The computer entity being booted will always need a bootable device, and a bootable device controller. Accordingly, the solution presented in this invention is fully scaleable to multiple computers, as is illustrated in FIG. 4.

Figure 4:
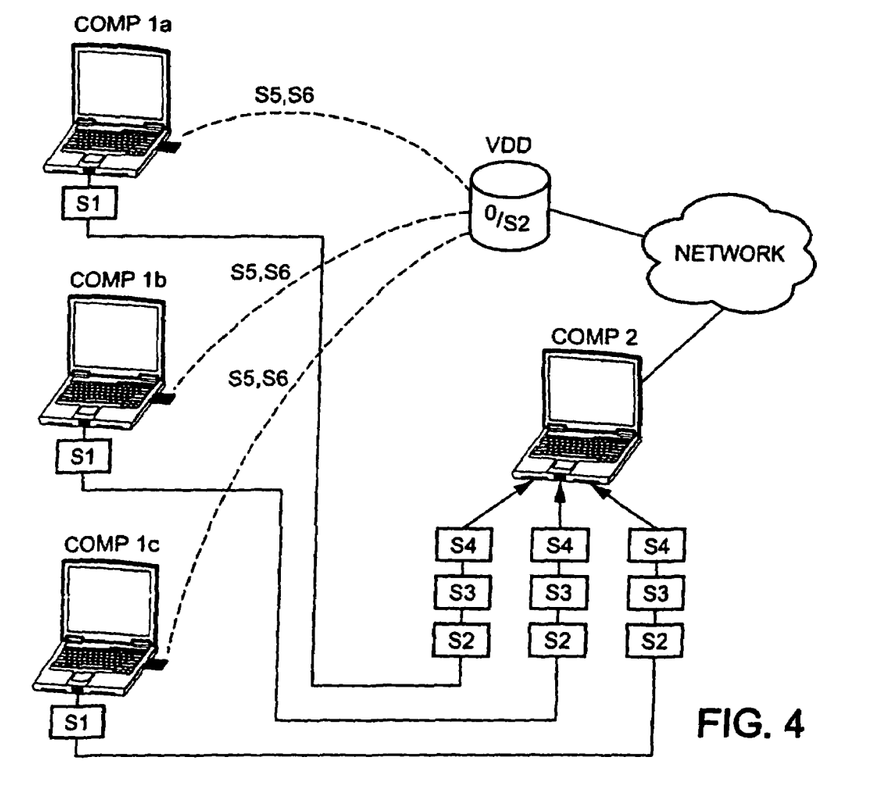
FIG. 4 illustrates a second computer operating system booting a plurality of first computers.

FIG. 4 illustrates a plurality of first computer COMP 1a, COMP 1b, COMP 1c, being operated from a second computer operating system OS2 (or copies thereof), and linked to each other by a network. The files that comprise OS2 are actually stored on a virtual disk drive homed on a Virtual Disk Drive server VDD. The first computer entities COMP 1a, COMP 1b, COMP 1c are booting off said virtual drive using their Network Interface Controllers NIC. To implement the solution as set forth in the present invention, it suffices to repeat steps S1 to S6 as set forth above to the present embodiment. For each of the first computers COMP1a, COMP1b, and COMP1c, one would therefore "extract" (step S1) a set of initialisation data and store them on a storage media, be it a network-connected storage media or a removable storage media. The initialisation data would then be individually adapted (step S3) for use in the second operating system OS2, and individually inserted (or "injected") (step S4) into the initialisation structure of the second operating system OS2 via a second computer entity COMP2.

The virtual disk system VDD is then configured so that the virtual drive that stores the files that comprise the second operating system OS2 is shared by each of the first computer entities COMP 1a, COMP1b, and COMP1c through the network link as a bootable drive, in order to boot (step S6) each of the respective systems with the operating system OS2.

Below will be presented further embodiments of the present invention, in the case of an absence of physical connections between the first and second computer entities. In other words, both first and second computer entities are stand alone entities, as one might commonly find for home setups.

Figure 5A:
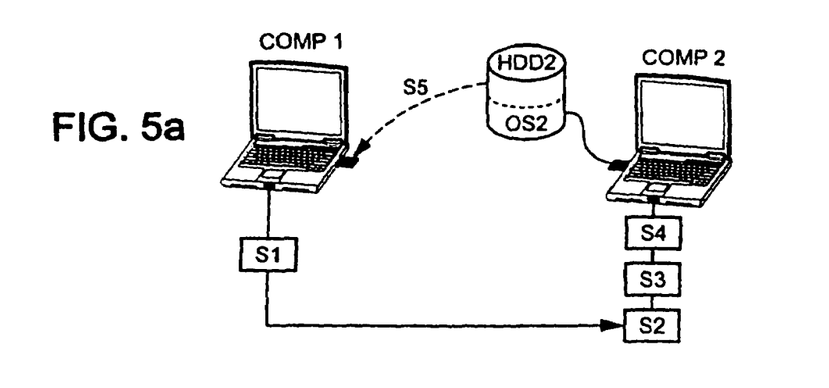
FIGS. 5a and 5b illustrate a further embodiment whereby a physical transfer of hardware is effected.
Figure 5B:
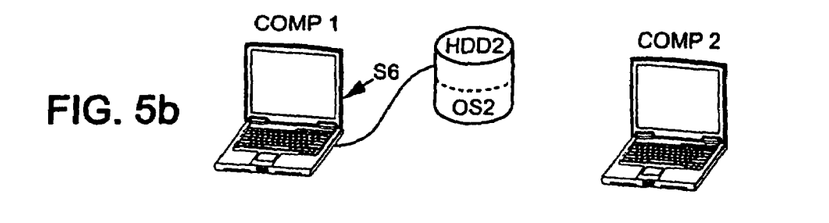

In this case, it is realisable to allow communication by a physical transfer of hardware, as is illustrated in FIGS. 5a and 5b.

The step S1 through to step S4, relating to extracting the initialisation data (step S1), adapting the data (step S3) and injecting the data in to the second computer's operating system (step S4), takes place as described in any of the previous embodiments, in an identical manner, and using a removable media as a storage device for the initialisation data.

However, in the absence of a network connection to link the computer entities COMP1, COMP2 together to a virtual shared boot drive, and therefore boot a first computer entity COMP1 off the second computer entity's operating system OS2 via the network, it is realisable to physically transfer the storage media HDD2 to the first computer COMP1, after the injection (step S4) has taken place. In this embodiment therefore, the step S5 will further entail an operation of disconnecting the second storage medium HDD2 from second computer COMP2, and reconnecting the medium HDD2 in the first computer COMP1. The operating system of the second computer entity OS2 will therefore be present and connected to the first computer entity COMP1. Once a connection between the media containing the second operating system OS2 and the first computer COMP1 is available, the second operating system OS2 is able to directly boot the first computer, as described in step S6.

If a hard disk were already present in the first computer COMP1, this first hard disk would act as a slave to the imported hard disk HDD2.

The above embodiment leads to the possibility of, for example, having a single master hard disk drive containing a typical system configuration for a user to be used and installed in a failing first computer. This would enable a rescue attempt of a failed system, or at least access to data stored on a hard disk drive of a first computer.

Similarly, again in the absence of a connection between a first and a second computer entity, a further embodiment is presented below.

Figure 6A:
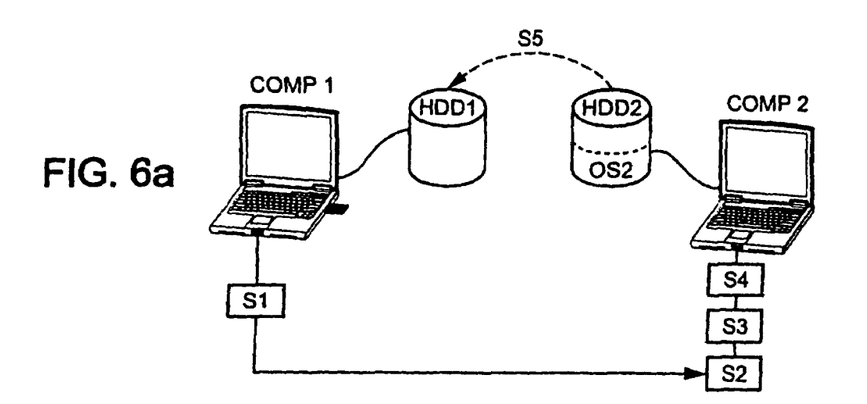
FIGS. 6a and 6b illustrate yet another embodiment whereby a hard disk drive of a second computer is copied ("cloned") to a first computer.
Figure 6B:
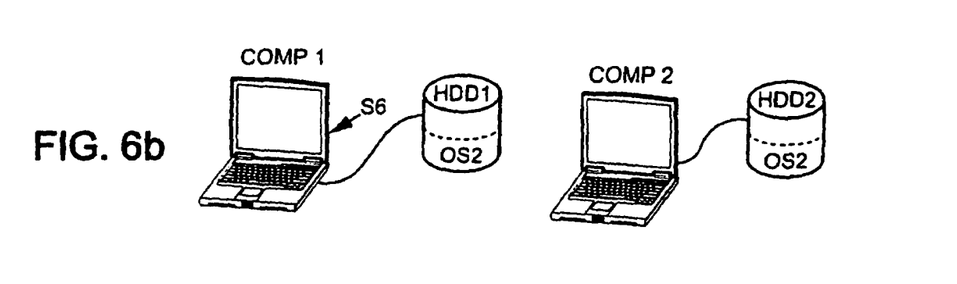

FIGS. 6a and 6b illustrate the procedure. This procedure does not involve a physical transfer of hardware as was disclosed in the last embodiment, but a copy ("clone") of the second computer's content of the hard disk drive that contains the operating system OS2 to a first computer's storage medium HDD1, thereby giving the first computer COMP1 access to the second computer's operating system OS2.

FIG. 6a represents the same basic steps as was described for FIG. 5a. FIG. 6a differs in that instead of effecting a step S5 involving a physical transfer of hardware, the step S5 involves a cloning the second computer's storage medium HDD2 containing the second computer's operating system OS2.

Thereby, the first computer entity's storage media HDD1 also now further comprises the entirety of the second computer's storage medium HDD2, including the operating system OS2 and the new initialisation structure injected in step S4.

The rest of the procedure, as illustrated in FIG. 6b is identical to FIG. 5b, and therefore the first computer COMP1 is able to boot off the second computer's operating system OS2, which is now present in the first computer's storage medium HDD1.

Outside of hardware considerations, the whole process of extracting initialisation data from a first computer entity, and inserting into a second computer entity is carried out by a computer entity program. It comprises instructions for the implementation of the method as set forth above.

The computer entity program may be a set of instruction codes for the extraction in step S1. This may be followed by further code to carry out step S2 (reading data and copying some of them to the media that contains the files that collectively comprise operating system OS2), step S3 (to adapt the data) and step S4, that is to insert the data into the second computer entity operating system files and internal structures. Alternatively, the extractor program may be followed by a separate, complementary, program entity installed on the second computer entity, which itself carries out step S3 and step S4 on the second computer entity's operating system.

The present invention also aims at such a computer entity program, the algorithm of which can be illustrated by a flow chart similar to the one drawn in FIG. 2a. It will be noted that manually retrieving initialisation data and transferring them in a coherent and/or compatible manner into the correct data structures intended to be used by the second operating system would be fastidious for the typical user. The computer entity program according to the invention advantageously provides such functionalities, automatically.

As will be appreciated, the present invention does not limit itself to the embodiments described hereabove purely as examples; the invention also extends to other embodiments.

Therefore, it is in no way limited to:
the type of operating system, as long as it is Plug-And-Play compatible,
the peripherals present (hard disk drive, network interface cards, or others), the essential being able to boot a first computer entity using the operating system of a second computer entity,
the number of first computer entities to be booted by a second computer entity,
the type of storage for copying initialisation data,
or indeed the type of connection between either computer entities.

Moreover, the invention is not limited to a particular order of the steps as defined hereabove. For example, step c) (referred S3 on FIG. 2a) for adapting read data can be performed after step d) (referred S4 on FIG. 2a) aiming at copying these data.

The invention claimed is:

1. A method for operating at least one first computer entity with an operating system of a second computer entity, said first and second computer entities being operated with respective first and second operating systems, said first computer entity comprising: at least one bootable device, and at least one device controller for operating said at least one bootable device, and storing: at least one set of initialization data and drivers files, said data and files being used by said first operating system to initialize and operate said device controller, computer files of said second operating system being stored in a media further storing initialization structures intended to be used by the second operating system to initialize and operate at least the second computer entity, wherein said first computer entity is operated with the second operating system through said at least one bootable device, said at least one bootable device being arranged for giving access to said media, and where the method comprises the steps of:
a) detecting and registering said set of initialization data and driver files stored in the first entity computer entity (S1),
b) copying said driver files into the files of the second operating system (S2),
c) adapting each of said files, and reading and adapting said initialization data, for the second operating system (S3),
d) injecting said initialization data into initialization structures of the second operating system (S4),
e) making said media containing said second operating system available to said first computer (S5),
f) initializing the first computer entity with the second operating system (S6), said initialization structures being used by the second operating system to initialize and operate the device controller of said at least one bootable device, and said device controller controlling access to said media that stores computer files of said second operating system to follow the initialization of the first computer entity with the second operating system.

2. The method as set forth in claim 1, wherein the initialization structures comprise registry entries comprising keys and values.

3. The method as set forth in claim 1, wherein said at least one device controller of the first computer entity is a hard disk controller, and wherein, before step f), a system hard disk (HDD2) of the second computer entity comprising the second operating system files is installed into the first computer entity.

4. The method as set forth in claim 1, wherein said at least one device controller of the first computer entity is a hard disk controller controlling a first computer hard disk and wherein, before step f), a system hard disk of the second computer (HDD2) comprising the second operating system files entity is cloned onto said first computer hard disk.

5. The method as set forth in claim 1, wherein said at least one device controller is a network interface controller (NIC) included in said first computer entity, and wherein the media is a network server accessible to said second computer via the network interface card.

6. The method as set forth in claim 1, wherein the at least one set of initialization data and driver files is registered on a network server and wherein the copying of step b) and the reading of step c) are carried out through the network.

7. The method as set forth in claim 1, wherein, for operating a plurality of first computer entities with the second computer entity operating system, steps a), b), c), d), e) and f) are repeated for each of the first computer entities.

8. The method as set forth in claim 1, wherein, at step a), the at least one set of initialization data and driver files is stored on a removable storage, and, at steps c) and d), the second computer entity reads said removable storage to inject said set of initialization data and driver files into the initialization structures of the second computer operating system.

9. The method as set forth in claim 1, wherein the adapting step performed in step c) comprising adapting UUID data as registered in step a) to match UUID data present in the second operating system (OS2).

10. A non-transitory computer readable storage medium on which is embedded a computer program, said computer program implementing a method for operating at least one first computer entity with an operating system of a second computer entity, said first and second computer entities being operated with respective first and second operating systems, said first computer entity comprising: at least one bootable device, and at least one device controller for operating said at least one bootable device, and storing: at least one set of initialization data and drivers files, said data and files being used by said first operating system to initialize and operate said device controller, computer files of said second operating system being stored in a media further storing initialization structures intended to be used by the second operating system to initialize and operate at least the second computer entity, wherein said first computer entity is operated with the second operating system through said at least one bootable device, said at least one bootable device being arranged for giving access to said media, said computer program comprising a set of instructions to:
- a) detect and register said set of initialization data and driver files stored in the first entity computer entity (S1),
- b) copy said driver files into the files of the second operating system (S2),
- c) adapt each of said files, and read and adapt said initialization data, for the second operating system (S3),
- d) inject said initialization data into initialization structures of the second operating system (S4),
- e) make said media containing said second operating system available to said first computer (S5),
- f) initialize the first computer entity with the second operating system (S6), said initialization structures being used by the second operating system to initialize and operate the device controller of said at least one bootable device, and said device controller controlling access to said media that stores computer files of said second operating system to follow the initialization of the first computer entity with the second operating system.

11. The non-transitory computer readable storage medium of claim 10, said computer program comprising a set of instructions to:
repeat steps a), b), c), d), e) and f) for each of a plurality of first computer entities to be operated with the second computer entity operating system.

* * * * *

UNITED STATES PATENT AND TRADEMARK OFFICE
CERTIFICATE OF CORRECTION

| | | |
|---|---|---|
| PATENT NO. | : 8,060,738 B2 | Page 1 of 1 |
| APPLICATION NO. | : 12/086164 | |
| DATED | : November 15, 2011 | |
| INVENTOR(S) | : Yves Gattegno et al. | |

It is certified that error appears in the above-identified patent and that said Letters Patent is hereby corrected as shown below:

In column 14, line 4, in Claim 1, after "first" delete "entity".

In column 15, line 16, in Claim 10, after "first" delete "entity".

Signed and Sealed this
Twenty-eighth Day of August, 2012

David J. Kappos
*Director of the United States Patent and Trademark Office*